US011221001B2

(12) United States Patent
Lima

(10) Patent No.: US 11,221,001 B2
(45) Date of Patent: Jan. 11, 2022

(54) UNTWISTED ARTIFICIAL MUSCLE

(71) Applicant: Lintec of America, Inc., Richardson, TX (US)

(72) Inventor: Marcio Dias Lima, Richardson, TX (US)

(73) Assignee: LINTEC OF AMERICA, INC., Richardson, TX (US)

( * ) Notice: Subject to any disclaimer, the term of this patent is extended or adjusted under 35 U.S.C. 154(b) by 0 days.

(21) Appl. No.: 16/970,539

(22) PCT Filed: Feb. 15, 2019

(86) PCT No.: PCT/US2019/018276
§ 371 (c)(1),
(2) Date: Aug. 17, 2020

(87) PCT Pub. No.: WO2019/164768
PCT Pub. Date: Aug. 29, 2019

(65) Prior Publication Data
US 2021/0071649 A1 Mar. 11, 2021

Related U.S. Application Data

(60) Provisional application No. 62/632,985, filed on Feb. 20, 2018.

(51) Int. Cl.
*F03G 7/06* (2006.01)
*D01H 7/02* (2006.01)
(52) U.S. Cl.
CPC ............... *F03G 7/06* (2013.01); *D01H 7/02* (2013.01)
(58) Field of Classification Search
CPC .................. F03G 7/06; D01H 7/02

USPC .......................... 60/527–529; 310/306–307
See application file for complete search history.

(56) References Cited

U.S. PATENT DOCUMENTS

| 9,556,858 B2* | 1/2017 | Buttolph | F03G 7/065 |
| 10,626,846 B2* | 4/2020 | Herrig | F03D 7/0228 |
| 10,793,979 B2* | 10/2020 | Ridley | D02G 1/0286 |
| 11,050,366 B2 | 6/2021 | Yamauchi et al. | |
| 2011/0131971 A1* | 6/2011 | Walls-Bruck | F03G 7/065 60/527 |

(Continued)

FOREIGN PATENT DOCUMENTS

| EP | 2333334 A2 | 6/2011 |
| JP | 7-007975 | 1/1995 |

(Continued)

OTHER PUBLICATIONS

Japan Notice Of Reasons For Rejection received in JP Application No. 2020-543290, dated Jun. 7, 2021 and English language translation thereof.

(Continued)

*Primary Examiner* — Hoang M Nguyen
(74) *Attorney, Agent, or Firm* — Greenblum & Bernstein, P.L.C.

(57) ABSTRACT

An actuator and method of manufacturing an actuator that includes a core fiber with polymers aligned along the length of the core fiber, and a wire that is wound around and fixed to the core fiber. The winding of the wire is engineered based on the torsional actuation. Upon heating the core fiber, the wire impedes radial expansion of the core fiber and converts the radial expansion into a torsional actuation.

20 Claims, 3 Drawing Sheets

(56) References Cited

U.S. PATENT DOCUMENTS

2017/0314539 A1  11/2017  Kim et al.

FOREIGN PATENT DOCUMENTS

| JP | 9-312984 | 12/1997 |
| JP | 2011-117452 | 6/2011 |
| JP | 2018-46592 | 3/2018 |
| JP | 2018-159352 | 10/2018 |
| WO | 2018/020795 A1 | 2/2018 |
| WO | 2018/173745 A1 | 9/2018 |

OTHER PUBLICATIONS

International Search Report issued in corresponding International Application No. PCT/US2019/018276 dated Jun. 24, 2019 (3 pages).
Written Opinion of the International Searching Authority issued in corresponding International Application No. PCT/US2019/018276 dated Jun. 24, 2019 (6 pages).
Notice of Allowance received in JP 2020-543290, dated Oct. 11, 2021 and English translation.

* cited by examiner

UNTWISTED ARTIFICIAL MUSCLE

CROSS REFERENCE TO RELATED APPLICATIONS

This is a national stage application of International Patent Application No. PCT/US2019/018276, filed on Feb. 15, 2019, and claims priority to U.S. Provisional Patent Application No. 62/632,985 filed on Feb. 20, 2018. The contents of these applications are hereby incorporated by reference in their entirety.

BACKGROUND

Artificial muscle devices based on elastic polymeric fibers have a wide range of applications. Artificial muscle devices that include twisted and/or coiled polymers may have the advantages of lower production cost, higher production volume, lower operation noise, and simpler design over conventional motors.

SUMMARY

In one aspect, embodiments disclosed herein are related to an actuator that includes a core fiber comprising polymers aligned along a length of the core fiber. The core fiber may have a higher radial thermal expansion coefficient than the bulk thermal expansion coefficient of the polymers. The actuator includes a wire wound around the core fiber. The winding of the wire is engineered based on the torsional actuation. Upon heating the core fiber, the wire impedes radial expansion of the core fiber and converts the radial expansion into torsional actuation in accordance with one or more embodiments.

In another aspect, embodiments disclosed herein are related to a method of manufacturing an actuator that includes placing a core fiber with polymers aligned along the length of the core fiber between two rigid components, without stretching the core fiber. The core fiber may have a higher radial thermal expansion coefficient than the bulk thermal expansion coefficient of the polymers. The method includes wrapping a wire around the core fiber and securing the wire to the core fiber. The winding of the wire is engineered based on the torsional actuation. Upon heating the core fiber, the wire impedes radial expansion of the core fiber and converts the radial expansion into a torsional actuation in accordance with one or more embodiments.

Other aspects and advantages of one or more embodiments will be apparent from the following description and the appended claims.

DETAILED DESCRIPTION

Figure 1:
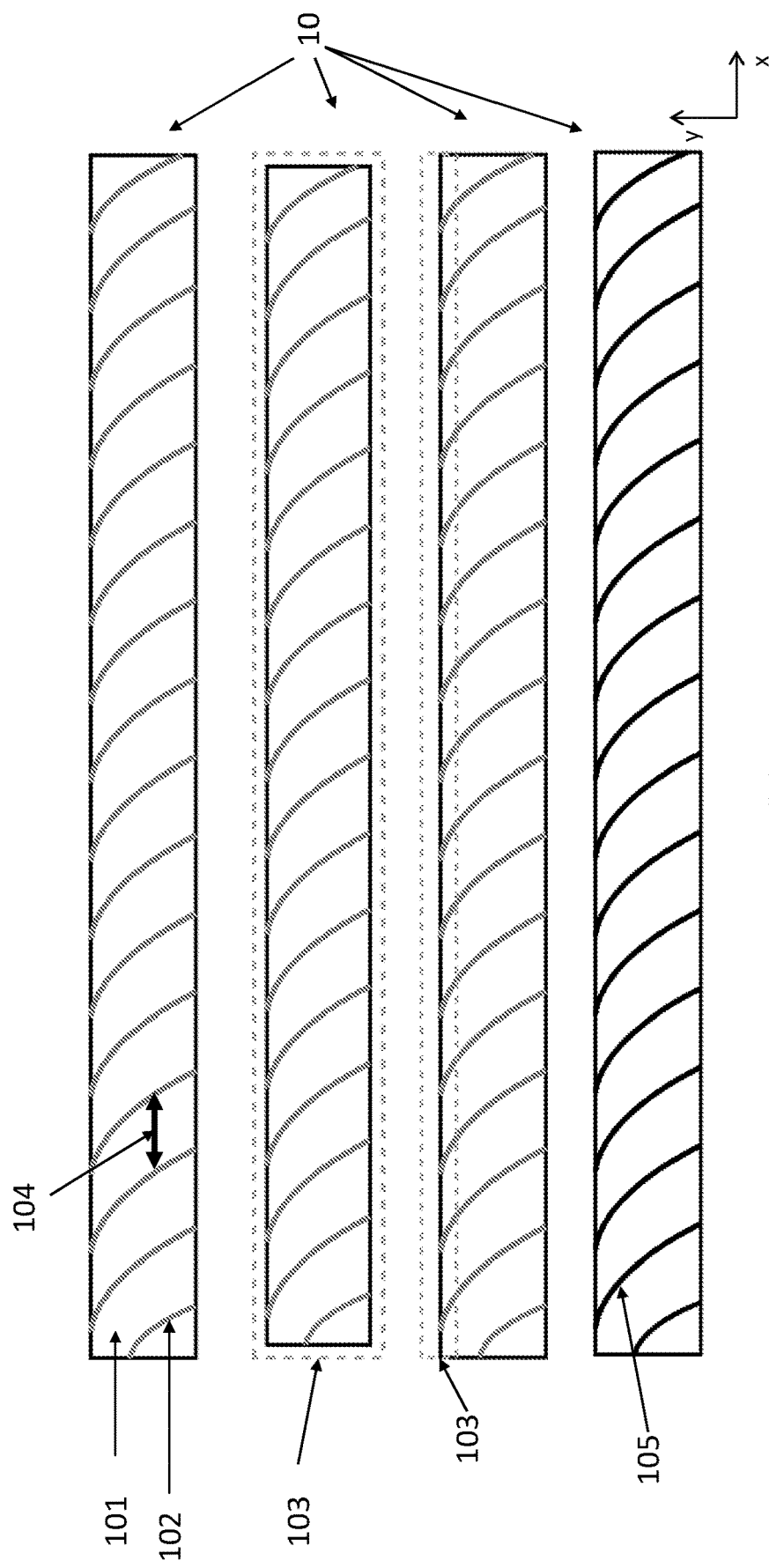
FIG. 1 shows a diagram in accordance with one or more embodiments of the invention.

In the following detailed description of embodiments of the disclosure, numerous specific details are set forth in order to provide a more thorough understanding of the invention. However, it will be apparent to one of ordinary skill in the art that the disclosure may be practiced without these specific details. In other instances, well-known features have not been described in detail to avoid unnecessarily complicating the description.

Artificial muscle actuators are conventionally made using a twisted fiber with a wire wrapped around the twisted fiber. The wrapped fiber is then twisted around a mandrel, annealed, and then the mandrel is removed. Twisting of the polymer fiber introduces stress, reduces strength, and may break some polymer chains in the fiber or the wrapped wire. The alignment and twist of the polymer chains in the fiber determine the actuation in the conventional artificial muscles. Furthermore, in conventional artificial muscles, the wire merely heats up the polymer fiber. However, the wire does not direct or transform the actuation force that is produced during actuation.

In general, embodiments of the invention relate to an apparatus that includes one or more untwisted artificial muscle fibers (hereinafter referred to as "untwisted artificial muscle") and a method for manufacturing the untwisted artificial muscle. In one or embodiments, "untwisted artificial muscle fibers" refers to an artificial muscle that is not twisted or coiled in the manufacturing process. In one or more embodiments, the untwisted artificial muscle may not be annealed. By omitting the twisting and/or annealing, production cost may be lowered. In addition, one or embodiments may have a higher tensile strength than a conventional twisted muscle as a result of the no twisting and/or no annealing and, therefore, embodiments of the invention may be more suitable for lower axial loads.

In general, embodiments are directed to the untwisted artificial muscle fiber that includes an untwisted core fiber (hereinafter referred to as core fiber) and a wire that is wrapped (i.e., wound) and secured around the core fiber. Upon heating the core fiber, the wire impedes the radial expansion of the core fiber and converts the radial expansion to a desired torsional actuation of the core fiber and the wire.

In one or more embodiments, the wire may be secured to the core fiber using an adhesive. The wire may be secured using other means, for example a coating or sleeve may be used.

In accordance with one or more embodiments, the core fiber is composed of polymers aligned along the length of the core fiber. The core fiber has a high radial thermal expansion, a small, or negative, linear thermal expansion coefficient. In one or more embodiments, the core fiber may have a higher radial thermal expansion coefficient than the bulk thermal expansion coefficient of the polymer.

In one or more embodiments, a wire is wound around the core fiber. The wire is selected to have a high Young's modulus and a low bending modulus. For example, the Young's modulus may be greater than 100 Gigapascals. Depending on the material of the wire, the production cost may be lowered even further.

In accordance with one or more embodiments, the wire may be helically wound around the core fiber. In accordance with these embodiments, the wire maybe wrapped at a specific pitch. The specific pitch may be selected based on the desired torsional actuation and such that the edges of the wire do not touch upon actuation. In one or more embodiments, the pitch is less than the diameter of the core fiber.

In one or more embodiments of the invention, the wrapping of the wire may be controlled based on the desired actuation of the device. For example, the wire may be helically wound at different pitches along the length of the polymer fiber resulting in different torsional actuations along the length of the fiber. The wrapping may be controlled to facilitate the desired actuations in accordance with one or embodiments.

In one or more embodiments of the invention, the core fiber may be resistively heated using an applied voltage. In some embodiments, the applied voltage is applied to the wire to provide the resistive heating. The resulting temperature of the core fiber may be control by the applied voltage. The core fiber is heated to a temperature greater that the glass transition temperature of the fiber, but less than the melting temperature of the fiber.

FIG. 1 illustrates an untwisted artificial muscle apparatus in accordance with one or more embodiments. The untwisted artificial muscle 10 includes a core fiber 101 and a wire 102 that is helically wrapped around the core fiber 101. In order to fix the wire 102 in its place around the core fiber 101, an adhesive 103 may be disposed on the wire 102 and/or the core fiber 101. The adhesive 103 may cover the entire surface of the untwisted artificial muscle 10 or it may partially cover the untwisted artificial muscle 10.

According to one or more embodiments, the wire 102 can be a nylon wire 105 wrapped around the untwisted artificial muscle 10.

According to one or more embodiments, the wire 102 may be a conductive wire (e.g., a metallic wire) that can transfer the heat through the fiber and actuate the untwisted artificial muscle 10.

In accordance with one or embodiments, the core fiber 101 may be chosen from a material that has a high radial thermal expansion coefficient. Embodiments of the core fiber 101 may also have a negative linear (along the length of the core fiber that is along the "x" axis in view of FIG. 1) thermal expansion coefficient.

In one or more embodiments, for example, the material of the core fiber may include, but is not limited to, any of nylon, Polyethylene, Polyester, Polyethylene terephthalate (PET), Polyethylene naphthalate (PEN), Polypropylene, polyvinylidene difluoride (PVDF), Polyether ether ketone (PEEK), Liquid-crystal polymer, Kevlar, Vectran, or carbon nanotube (CNT) yarn. Other analogous materials as recognized by those of ordinary skill in the art may also be used for the core fiber 101.

According to one or more embodiments, the core fiber 101 may have some or all of the polymers aligned along the length of the core fiber 101. In some embodiments, the radial (i.e., perpendicular to the x axis in view of FIG. 1) thermal expansion coefficient of the core fiber 101 is greater than the bulk thermal expansion coefficient of the polymers. In one or more embodiments, the radial thermal expansion coefficient of the core fiber 101 may be further enhanced by the polymers having a negative linear (i.e., along the length of the core fiber) thermal expansion coefficient. For example, the linear thermal expansion coefficient of nylon is −180E-6 m/mK and the bulk thermal expansion coefficient of nylon is 80E-6 m/mK.

According to one or more embodiments, the wire 102 is chosen from a stiff material that has a high Young's modulus and a low bending modulus. The wire 102 may include, but is not limited to, any of nylon, Tungsten, CNT Yarn, CNT sheet, Carbon Fibers, Kevlar, Silver-plated Nylon, metal sheets or ribbons, Vectran, Dyneema, Toyobo ZYLON, Invar alloy, Fe—Ni alloys, or highly-aligned polymer fibers. For example, a tungsten wire has a Young's modulus as high as 400 GPa and a bending modulus sufficiently low so the wire 102 may be nicely wrapped around the core fiber 101. The bulk thermal expansion coefficient of Tungsten is 4E-6 m/mK.

Upon heating the core fiber 101, it expands radially. However, a helically wound wire 102 impedes any change in length and converts the radial expansion of the core fiber 101 into a torsional actuation. The helically wrapped wire 102 may be wrapped to have a pitch 104 such that edges of the wire 104 do not touch when the actuator is actuated.

Figure 2:
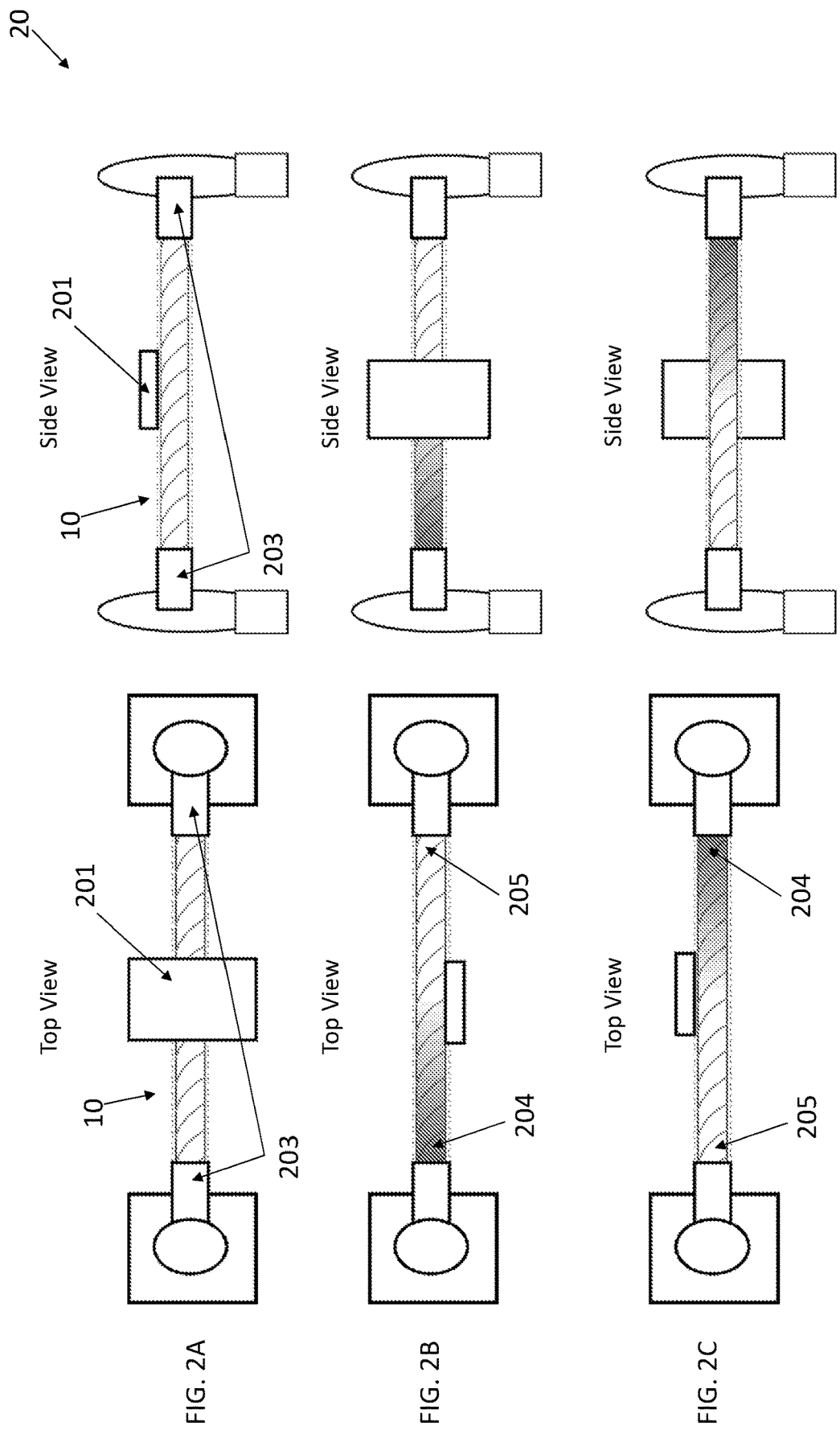
FIGS. 2A-2C show diagrams in accordance with one or more embodiments of the invention.

FIGS. 2A-2C illustrate top and side views (on the left side and the right side of the figures, respectively) of an actuator apparatus 20 and its actuating process in accordance with one or embodiments. The actuator apparatus 20 includes the untwisted artificial muscle 10, in which the ends of the untwisted artificial muscle 10 are fixed between two components 203. The components 203 may be rigid enough to prevent the ends of untwisted artificial muscle 10 from movement in any direction. The components 203 may be, for example, two metallic stands that hold the ends of untwisted artificial muscle 10. A load 201 such as a paddle is disposed on top of the untwisted artificial muscle 10 as illustrated. By heating one end of the untwisted artificial muscle 10, a side of the untwisted artificial muscle 10 that is closer to the heated end 204 rotates more than the unheated end 205 of the untwisted artificial muscle 10, and therefore, the untwisted artificial muscle 10 actuates and rotates the load 201.

According to one or more embodiments, the rotation direction of the load 201 depends on which end of the untwisted artificial muscle 10 is the heated end 204 and which one is the unheated end 205. For example, the heated end 204 in FIG. 2B is on the opposite side of the heated end 204 in FIG. 2C. Consequently, the load 201 in FIG. 2B rotates in an opposite direction from the load 201 in FIG. 2C.

In one or more embodiments, the load 201 may include a device (e.g., a camera, light source, sensor, etc.).

Figure 3:
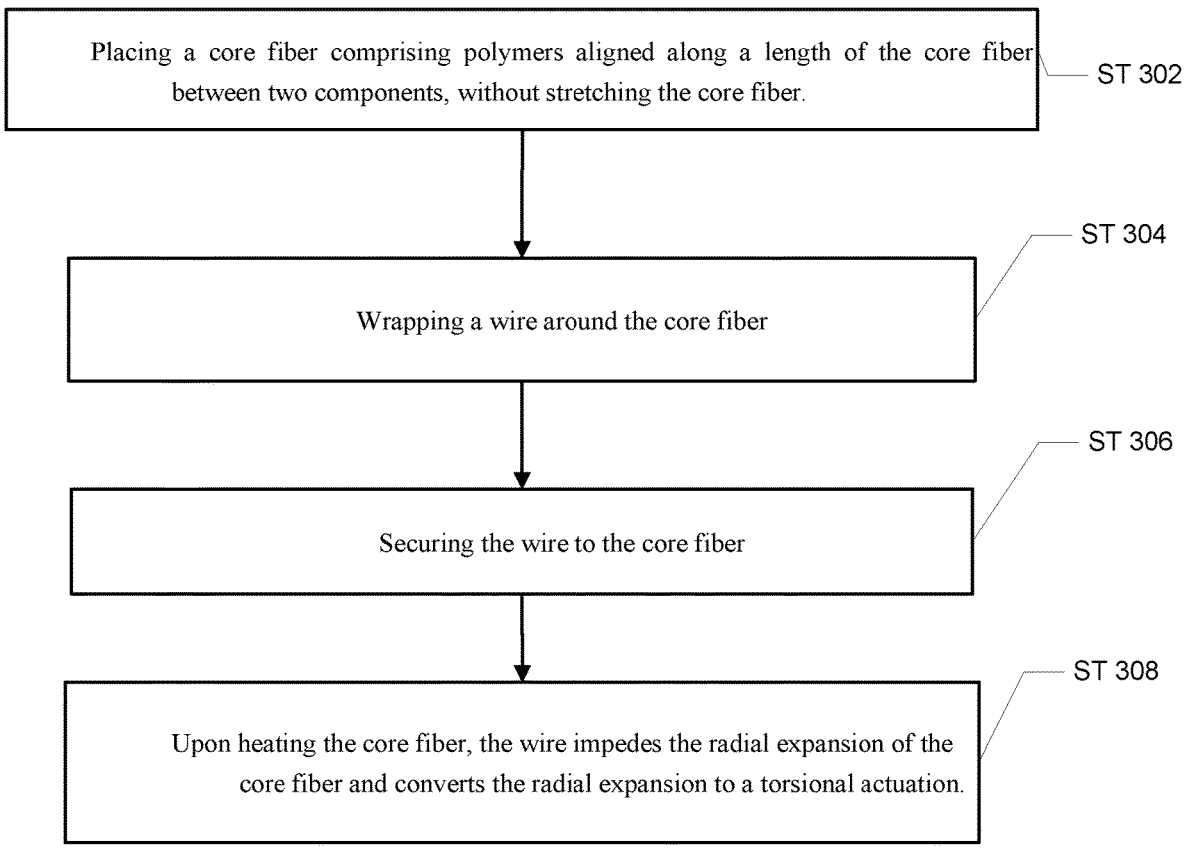
FIG. 3 shows a flow chart in accordance with one or more embodiments of the invention.

FIG. 3 shows a flow chart for manufacturing an untwisted artificial muscle (e.g., the untwisted artificial muscle 10 in FIGS. 1 and 2A-2C) in accordance with one or more embodiments. Embodiments of the method include the following steps. These steps disclosed below may be omitted, be performed multiple times, or be performed in a different order.

In step (ST) 302, a core fiber is prepared by placing one or more polymer fibers between two components without stretching the core fibers (e.g., similar to the core fiber 10 placed between the components 203 in FIGS. 2A-2C). In ST 304, a wire is wrapped around the core fiber (e.g., similar to the wire 102 in FIG. 1). In ST 306, the wire is secured for example by applying an adhesive or the like on the wire and/or core fiber to secure the wire in place (e.g., similar to the adhesive 103 in FIG. 1). In ST 308, upon heating the core fiber 10, the core fiber expands radially and the wire impedes this radial expansion; thus, converting the radial expansion into torsional actuation.

According to one or more embodiments, torsional actuation may result in a better performance for the untwisted artificial muscle than the conventional twisted fiber. In one or more embodiments, the thickness of the wire is less than the diameter of the core fiber divided by 5. As a non-limiting example, an untwisted artificial muscle with a 500 micrometer diameter core fiber made of nylon 6,6 fibers showed a torsional displacement of 21.72 degree/K·cm of the core fiber under a torsional load of 0.56 mN·m and an axial load of 0.098 N and in the temperature range from 100° C. to 180° C. However, under the same conditions, the conventional twisted fiber of same diameter that is coiled to have a bias angle of approximately 50 degree showed torsional displacement of 21.5 degree/K·cm.

According to one or more embodiments, the untwisted artificial muscle may be used in a self-packaging or a self-unwrapping container. In order to implement a security for such a self-packaging or self-unwrapping container, a type of key may be designed such that when the key is used, the untwisted artificial muscle is heated and the container wraps or unwraps. According to one or more embodiments, the untwisted artificial muscle apparatus may be disposable, depending on the application.

In one or more embodiments, the untwisted artificial muscle may be coupled to a power switch (e.g., an electronic switch) and a heating means such that the power switch triggers the heating means to heat and actuate the untwisted artificial muscle.

In one or more embodiments, the heating means may be a power source (e.g., a battery) that may be connected to the (conductive) wire around the core fiber and the heating means may resistively heat the core fiber. However, embodiments of the invention are not limited to resistive heating of the core fiber and other means (e.g., radiation and/or the direct application of heat) may be used to initiate the actuation.

While the invention has been described with respect to a limited number of embodiments, those skilled in the art, having benefit of this disclosure, will appreciate that other embodiments can be devised without departing from the scope of the invention as disclosed herein.

What is claimed is:

1. An actuator, comprising:
    a core fiber comprising polymers aligned along a length of the core fiber, the core fiber being disposed between two components that prevent linear and torsional movement at opposing ends of the core fiber, wherein each of the opposing ends of the core fiber is fixed to a corresponding one of the two components that prevent the linear and the torsional movement at the opposing ends of the core fiber;
    a wire wound around the core fiber that impedes a radial expansion of the core fiber and converts the radial expansion to a torsional actuation,
        wherein the core fiber has a negative linear thermal expansion coefficient, and
        wherein the core fiber has a higher radial thermal expansion coefficient than a bulk thermal expansion coefficient of the polymers.

2. The actuator according to claim 1, wherein a Young's modulus and a bending modulus of the wire are selected based on the torsional actuation.

3. The actuator according claim 1, wherein the wire is secured to the core fiber with an adhesive.

4. The actuator according to claim 1, wherein the wire is helically wound around the core fiber.

5. The actuator according to claim 1, wherein the wire is wound at a specific pitch, such that edges of the wire do not touch upon the torsional actuation.

6. The actuator according to claim 1, wherein the wire is non-uniformly wound based on the torsional actuation.

7. The actuator according to claim 1, wherein the core fiber is any of nylon, Polyethylene, Polyester, Polyethylene terephthalate (PET), Polyethylene naphthalate (PEN), Polypropylene, polyvinylidene difluoride (PVDF), Polyether ether ketone (PEEK), Liquid-crystal polymer, aramid, a multifilament yarn spun from liquid crystal polymer, or carbon nanotube (CNT) yarn.

8. The actuator according to claim 1, wherein the wire is any of nylon, Tungsten, carbon nanotube (CNT) Yarn, CNT sheet, Carbon Fibers, aramid, Silver-plated Nylon, metal sheets or ribbons, a multifilament yarn spun from liquid crystal polymer, ultra-high molecular weight polyethylene, a spun isotropic crystal polymer, 64FeNi alloy, Fe—Ni alloys, or highly-aligned polymer fibers.

9. The actuator according to claim 1, wherein the two components hold the opposing ends of the core fiber and the wire without stretching the core fiber.

10. The actuator according to claim 1, further comprising: a switch that triggers the actuator to torsionally actuate and wrap or unwrap a self-packaging or self-unwrapping container.

11. A method of manufacturing an actuator, the method comprising:
    placing a core fiber comprising polymers aligned along a length of the core fiber between two components, without stretching the core fiber;
    winding a wire around the core fiber; and
    securing the wire to the core fiber, wherein
    upon heating the core fiber, the wire impedes radial expansion of the core fiber and converts the radial expansion to a torsional actuation, and
    the two components prevent linear and torsional movement at opposing ends of the core fiber,
        wherein each of the opposing ends of the core fiber is fixed to a corresponding one of the two components that prevent the linear and the torsional movement at the opposing ends of the core fiber,
        wherein the core fiber has a negative linear thermal expansion coefficient, and
        wherein the core fiber has a higher radial thermal expansion coefficient than a bulk thermal expansion coefficient of the polymers.

12. The method according to claim 11, wherein the wire is secured to the core fiber with an adhesive.

13. The method according to claim 11, wherein the wire is helically wound at a specific pitch such that edges of the wire do not touch upon the torsional actuation.

14. The method according to claim 11, wherein the wire is non-uniformly wound based on the torsional actuation.

15. The method according to claim 11, wherein the core fiber is any of nylon, Polyethylene, Polyester, Polyethylene terephthalate (PET), Polyethylene naphthalate (PEN), Polypropylene, polyvinylidene difluoride (PVDF), Polyether ether ketone (PEEK), Liquid-crystal polymer, aramid, a multifilament yarn spun from liquid crystal polymer, or carbon nanotube (CNT) yarn.

16. The method according to claim 11, wherein the wire is any of nylon, Tungsten, carbon nanotube (CNT) Yarn, CNT sheet, Carbon Fibers, aramid, Silver-plated Nylon, metal sheets or ribbons, a multifilament yarn spun from liquid crystal polymer, ultra-high molecular weight polyethylene, a spun isotropic crystal polymer, 64FeNi alloy, Fe—Ni alloys, or highly-aligned polymer fibers.

17. A method for converting radial expansion of a core fiber to torsional actuation, the method comprising:
    placing the core fiber comprising polymers aligned along a length of the core fiber between two components, without stretching the core fiber;
    winding a wire around the core fiber helically at a specific pitch such that edges of the wire do not touch upon the torsional actuation; and
    securing the wire to the core fiber with an adhesive, wherein
    upon heating the core fiber, the wire impedes the radial expansion of the core fiber and converts the radial expansion to the torsional actuation, and the two components prevent linear and torsional movement at opposing ends of the core fiber,
  wherein each of the opposing ends of the core fiber is fixed to a corresponding one of the two components that prevent the linear and the torsional movement at the opposing ends of the core fiber,
  wherein the core fiber has a negative linear thermal expansion coefficient, and
 wherein the core fiber has a higher radial thermal expansion coefficient than a bulk thermal expansion coefficient of the polymers.

18. The actuator according to claim 1, further comprising a load affixed to the core fiber at a position between the opposing ends of the core fiber.

19. The method according to claim 11, wherein a load is affixed to the core fiber at a position between the opposing ends of the core fiber.

20. The method according to claim 17, further comprising affixing a load to the core fiber at a position between the opposing ends of the core fiber.

* * * * *